United States Patent
Zajac

(10) Patent No.: US 8,371,103 B2
(45) Date of Patent: Feb. 12, 2013

(54) VALVE ASSEMBLY AND METHOD FOR HIGH TEMPERATURE INTERNAL COMBUSTION ENGINES

(75) Inventor: John Zajac, San Jose, CA (US)

(73) Assignee: Zajac Optimum Output Motors, Inc., San Jose, CA (US)

( * ) Notice: Subject to any disclaimer, the term of this patent is extended or adjusted under 35 U.S.C. 154(b) by 816 days.

(21) Appl. No.: 12/485,522

(22) Filed: Jun. 16, 2009

(65) Prior Publication Data

US 2009/0314233 A1  Dec. 24, 2009

Related U.S. Application Data

(60) Provisional application No. 61/073,943, filed on Jun. 19, 2008.

(51) Int. Cl.
*F02C 5/00* (2006.01)
*F01L 1/12* (2006.01)
*F16K 39/02* (2006.01)
*F16K 1/16* (2006.01)

(52) U.S. Cl. ............ 60/39.6; 123/88; 137/630; 251/298

(58) Field of Classification Search .................... 123/68, 123/69 R, 70 R, 71 R, 72, 87–89, 81 R–81 D, 123/188.16; 60/39.6, 39.63; 251/158, 298, 251/303; 137/630, 630.15
See application file for complete search history.

(56) References Cited

U.S. PATENT DOCUMENTS

| | | | | |
|---|---|---|---|---|
| 1,474,790 A * | 11/1923 | Russell | ..................... | 251/298 |
| 3,667,740 A * | 6/1972 | Mortstedt | ..................... | 261/39.2 |
| 5,687,762 A * | 11/1997 | Teets et al. | ..................... | 137/588 |
| 6,588,727 B2 * | 7/2003 | Christoffersen et al. | ..... | 251/303 |
| 7,415,947 B2 | 8/2008 | Zajac | | |
| 7,434,551 B2 | 10/2008 | Zajac et al. | | |
| 2007/0194264 A1 * | 8/2007 | Arov et al. | ..................... | 251/298 |

\* cited by examiner

*Primary Examiner* — Noah Kamen
(74) *Attorney, Agent, or Firm* — Edward S. Wright

(57) ABSTRACT

Valve assembly and method in which a valve member is connected to an elongated lever arm for controlling communication between two chambers in an internal combustion engine. The valve assembly is disposed at least partially within one of the chambers, and the valve member is moved between open and closed by an actuator connected to the lever arm. In some disclosed embodiments, a pilot valve is opened to equalize pressure on both sides of the valve member prior to moving the valve member toward the open position. In others, where a piston in an expansion cylinder is driven by hot, expanding gases from a separate combustion chamber, the exhaust valve is closed before the piston has completed its exhaust stroke, and pressure is allowed to build up in the expansion cylinder to a level corresponding to the pressure in the combustion chamber before the valve member is moved toward the open position.

25 Claims, 3 Drawing Sheets

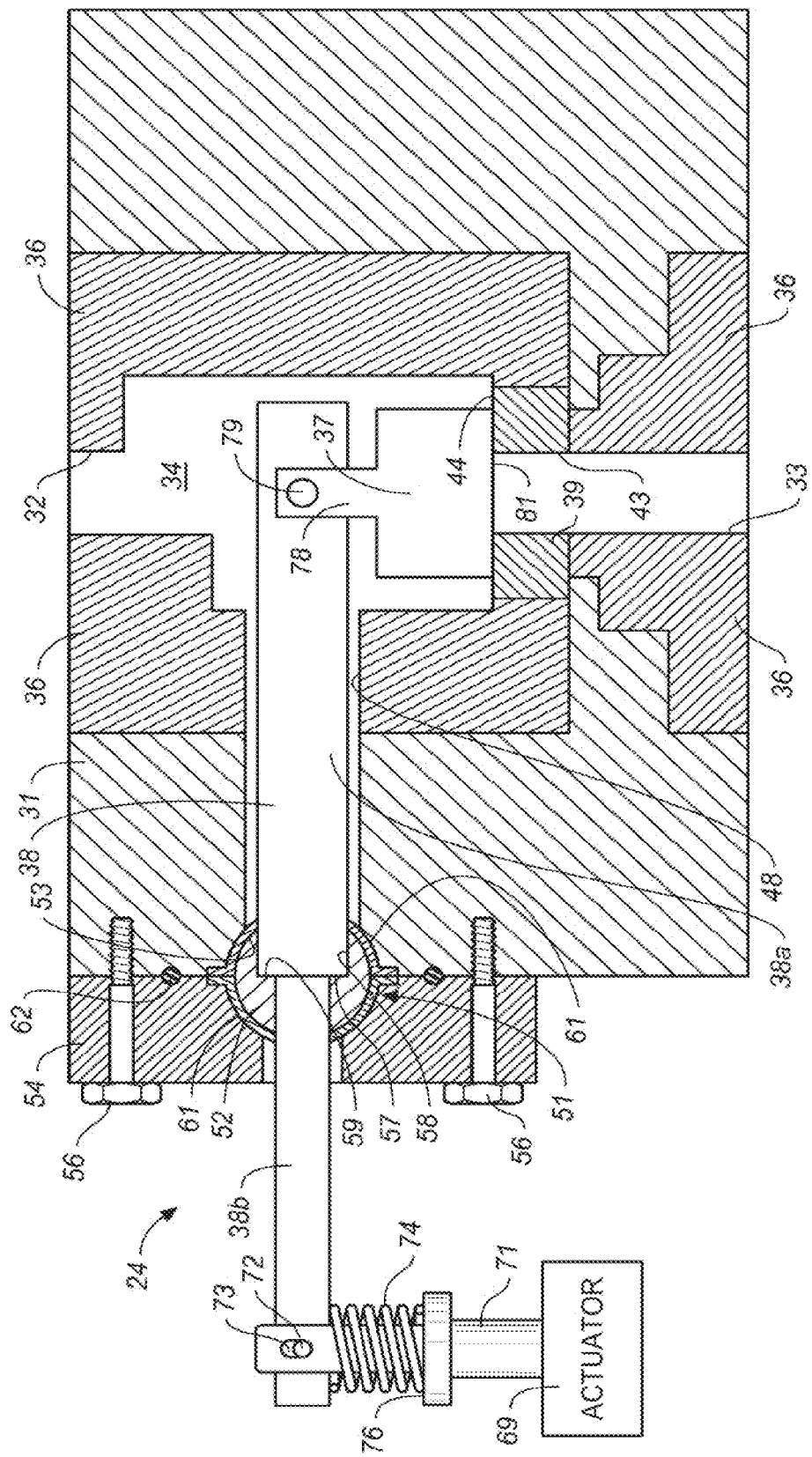

VALVE ASSEMBLY AND METHOD FOR HIGH TEMPERATURE INTERNAL COMBUSTION ENGINES

RELATED APPLICATION

This application is based on Provisional Application No. 61/073,943, filed Jun. 19, 2008, the priority of which is claimed.

BACKGROUND OF THE INVENTION

1. Field of Invention

This invention pertains generally to internal combustion engines and, more particularly, to a valve assembly and method for high temperature internal combustion engines.

2. Related Art

Valves used in conventional Otto and Diesel engines function reasonably well for some load conditions but have limitations, particularly with advanced engine designs using separate combustion chambers as described and illustrated, for example, in U.S. Pat. Nos. 7,415,947 and 7,434,551.

In conventional engines with cam operated valves, the valve springs must be stiff or strong in order to close the valves quickly and without bounce at higher engine speeds. With such springs, the force or work required to open the valves significantly limits the efficiency of an engine. Strong, stiff springs also make electronic valving difficult because of the difficulty of generating electromagnetic forces that are strong enough to overcome them. Cam operated valves are also limited by the number of degrees of cam rotation required in order to provide even a moderate valve lift or opening, and this limitation may prevent cam operated valves from meeting the timing requirements of more advanced engines. Moreover, in conventional engines, valve cooling is often required in order to prevent heat damage to the valves, and such cooling further reduces engine efficiency.

With advanced engine designs, the valves must meet additional design and performance requirements to fully utilize the capabilities of an engine. In engines having separate combustion chambers, the valves must open into the combustion chambers where the pressure is typically on the order of 500 to 1000 PSI and the temperature is on the order of 1600-1800° K. Since the valve assembly is located in the pressurized hot gas instead of the exhaust or intake manifold, valve actuation must be leak tight at high pressure and at high temperature. Moreover, because of the high temperature of the valve parts, the valve must be able to function without the use of traditional lubrication, and conventional valve guides probably cannot be employed as guides or bushings in the valve assembly. Furthermore, with variable valve timing and high speed operation in advanced engines, the valve opening and closing times must be short, and valve actuation strokes must also be short. Standard valves of the types heretofore provided cannot meet the demanding needs of advanced engines.

OBJECTS AND SUMMARY OF THE INVENTION

It is, in general, an object of the invention to provide a new and improved valve assembly and method for high temperature internal combustion engines.

Another object of the invention is to provide a valve assembly and method of the above character which overcomes the limitations and disadvantages of the prior art.

These and other objects are achieved in accordance with the invention by providing a valve assembly and method in which a valve member is connected to an elongated lever arm for controlling communication between two chambers in an internal combustion engine, with the valve member being moved between open and closed by an actuator connected to the lever arm. In some disclosed embodiments, a pilot valve is opened to equalize pressure on both sides of the valve member prior to moving the valve member toward the open position. In others, where a piston in an expansion cylinder is driven by hot, expanding gases from a separate combustion chamber, the exhaust valve is closed before the piston has completed its exhaust stroke, and pressure is allowed to build up in the expansion cylinder to a level corresponding to the pressure in the combustion chamber before the valve member is moved toward the open position.

BRIEF DESCRIPTION OF THE DRAWINGS

FIG. 3 is a fragmentary cross-sectional view of another embodiment of a valve assembly according to the invention.

DETAILED DESCRIPTION

Figure 1:
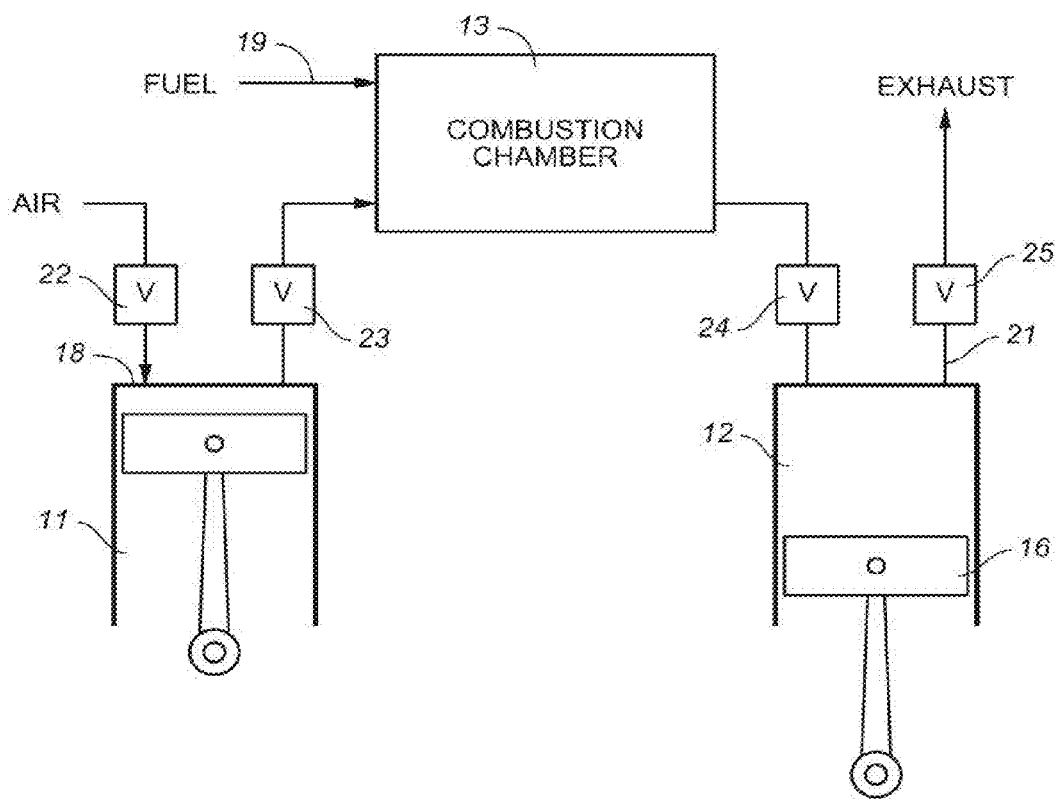
FIG. 1 is a schematic view of one embodiment of an engine having a separate combustion chamber and a valve assembly according to the invention.

In FIG. 1, the invention is illustrated in connection with an engine of the type described in detail and illustrated in U.S. Pat. Nos. 7,415,947 and 7,434,551, the disclosures of which are incorporated herein by reference. That engine has a compression chamber 11, an expansion chamber 12, and a separate combustion chamber 13, with reciprocating pistons 14, 16 in the compression and expansion chambers linked together by a crankshaft (not shown).

Air is drawn into the compression chamber through an inlet port 18 on the downstroke of piston 14, then compressed and thereby heated on the upstroke of the piston and injected into the inlet end of combustion chamber 13. In the combustion chamber, the hot, compressed air mixes with fuel introduced into the chamber through a fuel inlet 19 to form a mixture which burns throughout the chamber and produces a volumetric increase in the gas. The hot expanding gas is delivered to the expansion chamber where it drives expander piston 16 in a downward direction. Spent gases are expelled through an exhaust port 21 during the upstroke of the expander piston. Communication through the inlet and outlet ports and between the chambers is controlled by valves 22-25.

The sizing of the compression and expansion chambers, the movement of the pistons in them, and the timing of the valves can be made such that the temperature or pressure within the combustion chamber remains substantially constant throughout the operating cycle of the engine.

Figure 2:
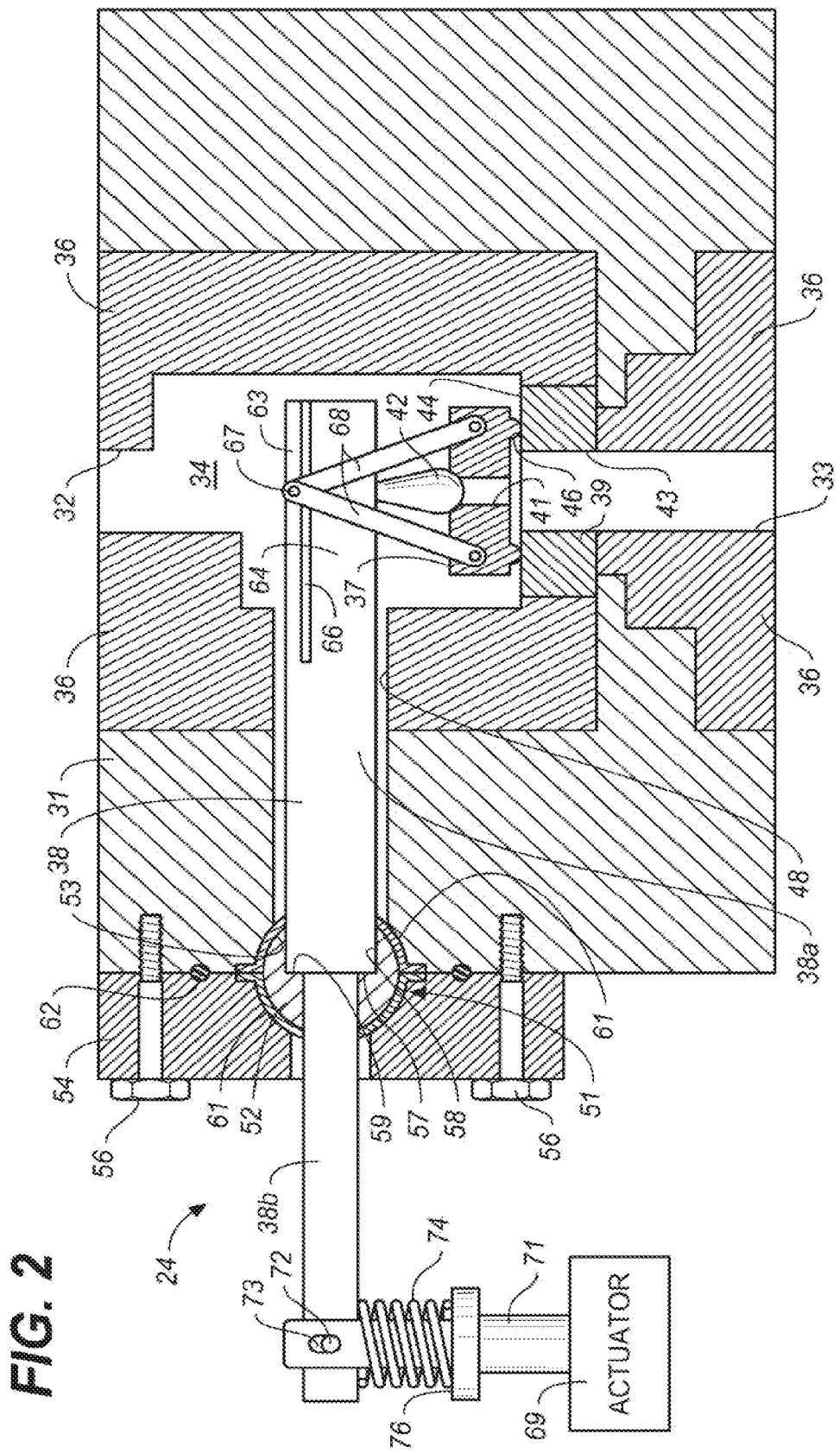
FIG. 2 is a cross-sectional view, partly schematic, of the valve assembly in the embodiment of FIG. 1.

As illustrated in FIG. 2, the valve assembly 24 that controls gas flow between the combustion chamber and the expander includes a valve body 31 having an inlet port 32 and an outlet port 33 on opposite sides of a chamber 34. The ports are surrounded by insulation 36 to prevent heat loss and loss of efficiency. Communication between the ports is controlled by a valve member 37 mounted on a lever arm 38 for movement between open and closed positions relative to a valve seat 39 which surrounds the outlet port.

Valve member 37 has a generally annular body with an axially extending passageway 41 through which gases can flow to bypass the valve member 37. Flow through the passageway is controlled by a pilot valve having a plug 42 movable between open and closed positions relative to the mouth of the passageway.

Valve seat 39 also has a generally annular body with a central opening 43 aligned axially with valve member 37 and outlet port 33. In the embodiment illustrated, the valve seat has a flat sealing surface 44 facing the valve member, and the valve member has a sealing bead 46 facing the sealing surface.

The valve member, valve seat, and pilot valve plug can all be fabricated of a hard, high temperature ceramic material such as aluminum oxide (alumina)or a strong, high temperature metal such as 90/10 tantalum/tungsten alloy that can withstand the high temperature and oxidation of the gases in the engine. When valve member 37 and valve seat 39 are ceramic, sealing can be provided by polishing the mating surfaces of the two parts to a smooth flat finish, with an overlap on the order of 0.05 to 0.25 inches generally being sufficient to prevent leakage. With high temperature metal, the seal can be made by a small sealing bead (as shown) or by a more conventional chamfered seat (not shown).

Lever arm 38 extends through a bore 48 in the valve body in a direction generally perpendicular to the axis of outlet port 33, with one end of the arm in chamber 34 and the other outside the valve body. The lever arm is mounted in a ball joint 51 comprising a ball 52 affixed to the arm and a spherical socket 53 formed partly in the valve body and partly in a retainer cap 54 which is secured to the valve body by mounting screws 56. The section 38*a* of the lever arm inside the valve body is of greater lateral dimension than the section 38*b* outside the valve body, with a shoulder 57 between the two. The ball has a stepped bore 58 through which the arm passes, with shoulder 57 abutting against a shoulder 59 within the bore. The ball is affixed to the lever arm by suitable means such as epoxy, and the abutting shoulders prevent the arm from being blown out of the ball in the event that the epoxy should ever fail.

The lever arm is fabricated of a material such as a ceramic material having a low thermal conductivity to prevent the transfer of heat from the hot gases passing through the valve to the ball joint and to the outer section of the arm. The ball is fabricated of a suitable metal, and sealing between the ball and the socket is provided by thin hemispherical or dome-shaped bushings 61 of a material such as brass which line the walls of the socket. Sealing between the retainer cap and the valve body is provided by an O-ring 62.

The inner section of the lever arm is split lengthwise into a relatively thin and flexible upper section 63 and a relatively thick and rigid lower section 64, with a slot 66 between the two sections. Valve member 37 is pivotally connected to the relatively flexible upper section by a pivot pin 67 and links 68, and pilot valve plug 42 is affixed to the under side of the relatively stiff lower section. The pivoting connection provides automatic alignment and ensures proper seating of the valve member against the valve seat, and the sealing surface of the pilot valve plug is rounded or spherical to ensure proper seating against a mating surface at the mouth of by-pass passageway 41 regardless of the position of the valve member.

An actuator 69 is connected to the outer end of the lever arm by a connector 71 for moving the valve member between open and closed positions relative to the valve seat. A pin 72 which extends laterally from the lever arm is received in vertically extending slotted openings 73 in the arms of the connector, with a compression spring 74 between the lever arm and a shoulder 76 on the connector.

In the closed position, lever arm 38 is in its horizontal or rest position, valve member 37 is sealed against valve seat 39, and pilot valve plug 42 is in its closed and sealed position against the mouth of passageway 41 in valve member 37. High pressure from inlet port 32 helps to keep the valve parts sealed so that no gas can leak out through outlet port 33.

The valve is opened by the actuator drawing the outer end of lever arm 38 in a downward direction, thereby rotating the arm in a counterclockwise direction and lifting the inner end of the arm in an upward direction. As the arm begins to rotate, the high pressure that has built up in combustion chamber 13 and in valve chamber 34 resists movement of valve member 37 away from valve seat, causing the upper section 63 of the arm to flex and the valve member to remain seated. However, with its much smaller surface area and force holding it against its seat, pilot valve plug 42 is drawn away from the mouth of passageway 41 by the stiff lower section 64 of the lever arm, thereby allowing some of the gasses to pass through the valve member and equalize the pressure on both sides of it. As the lever arm continues its rotation, valve member 37 is lifted away from seat 39 either when the pressure differential across it drops of a level which is overcome by the flexible section of the arm or when the stiff lower section abuts against the flexible upper section and thereafter carries that section with it, thus opening the valve to deliver the expanding gases from the combustion chamber to the expander.

The lift of the pilot valve and the timing between the opening of the pilot valve and the main valve are determined by the width or height of the slot between the upper and lower sections of the lever arm, and that width is chosen to be such that the pressures on the upper and lower sides of valve member 37 are substantially equal when the valve member is lifted away from the seat. With the pressures equalized, very little force is required to open the valve, and applicant has found that the valve can be opened with only a few inch-pounds of force, rather than the tens or hundreds of foot-pounds required by conventional cam driven valves.

A smaller lift permits faster valve action, and the width of the slot and lift of the pilot valve plug are typically on the order of 0.010". The amount of lift for valve member 37 is dependent upon engine size and maximum engine speed. In an engine that develops 50 hp per cylinder operating at a pressure of 600 psi, for example, the lift would be typically be on the order of 0.100", although that can vary with engine design and performance requirements. A valve assembly with a distance of 3" between the pivot axis of the lever arm and the pilot valve would need only 2° of lever arm rotation to provide the necessary 0.100 inches of lift for the valve to be fully open. This small amount of lift allows for high valve speeds, and the small amount of rotation allows for inexpensive valve shaft sealing with a long service life.

This sealing is important because high-temperature, high-pressure seals are difficult to make with linearly moving shafts and expensive to make with bellows. However, a rotating metal-to-metal, ceramic-to-ceramic, or ceramic to metal seal, as disclosed herein, eliminates this problem. Ball 52 has little rotating movement and seals tightly with the mating surfaces of the brass bushings in the ball socket.

To close the valve, actuator 69 pushes the outer end of lever arm 38 in an upward direction, rotating the arm in a clockwise direction and moving the inner end of the arm in a downward direction, thereby pressing pilot valve plug 42 against the mouth of the passageway in valve member 37 and pressing the valve member against valve seat 39. The manner in which actuator is connected to lever arm provides a small overclosure that ensures good contact and good sealing between valve parts. After the valve member is fully seated, the slotted openings in the connector arms allow the actuator to push the connector slightly further, until the lower walls of the openings abut against the pin, thereby compressing spring 74 slightly. The spring remains compressed until the start of the next cycle when the actuator once again pulls the connector down and the upper walls of the slotted openings engage the pin and draw the outer end of the lever arm down, too. The amount of compression should be small so as not to slow down the opening of the valve.

Some springiness or flexibility may also be provided by the flexibility of the lever arm. Depending upon how flexible the arm is, the flexibility provided by the arm can either be in addition to or in place of the flexibility provided by the spring.

The sealing surface of valve member 37 is always parallel to the sealing surface of seat 39 during sealing because the pivoting links 68 allow the parts to seal correctly even if lever arm 38 is not perfectly horizontal or parallel to the sealing surfaces at the time the parts start to mate. Any change in the length of the lever arm is not critical as long as the space between the sealing bead and the outlet port opening is greater than the change in length of the lever arm. With a flat polished surface instead of the sealing bead, sealing is ensured by making the overlap between the sealing surfaces wide enough to provide proper sealing notwithstanding changes in the length of the lever arm.

The pilot valve is also self-aligning with the moveable valve member to ensure a good fit and seal. The spherical end of pilot plug 42 can seal against the mouth of passageway 41 at any angle that may be created as the valve member moves to its correct seating and sealing position. In addition, the mating curvature at the mouth of the passageway ensures that the pilot plug will mate and seal with the pilot port regardless of the horizontal angle of valve member 37 or the horizontal angle of lever arm 38.

The embodiment of FIG. 3 differs from the embodiment of FIG. 2 in that it does not have a pilot valve. Instead, it utilizes the exhaust valve in the expansion cylinder to equalize the pressure across the valve member prior to the opening of the valve. In this embodiment, lever arm 38 is a single arm of circular cross section, and valve member 37 is solid. Mounting blocks 78 extend upwardly from the valve member on opposite sides of the lever arm and are pivotally connected to the lever arm by a pivot pin 79 that extends through the lever arm and mounting blocks. The amount of pivotal movement or swing can be limited to any desired amount by proper choice of the distance between the lower surface of the lever arm and the upper surface of the valve member.

In this embodiment, valve member 37 and valve seat 39 are fabricated of a high temperature ceramic material, and the valve member has a flat sealing surface 81 which seats against the flat sealing surface 44 of the valve seat.

Operation and use of the embodiment of FIG. 3 is similar to that described above except for the opening of the valve. Here, the pressure on the two sides of valve member 37 is equalized by closing the exhaust valve 25 in expansion cylinder 12 before piston 16 reaches its top dead center position so that the gas remaining in the cylinder is compressed by the piston to a pressure equal to the pressure in the combustion chamber (500 to 1000 psi) as the piston finishes its upstroke. With the pressure already equalized, the valve member starts to move away from the seat as soon as the lever arm begins its rotation, thereby providing even faster valve speeds than the embodiment with the pilot valve.

While this method of equalizing the pressure is particularly suitable for use in a constant pressure engine, it can also be utilized in other types of engines where the pressure across the valve is known. Any work done to compress this gas is recaptured when the gas expands on the down stroke, and compressing exhaust gas causes pressure above the piston to rise gradually which is considered to be beneficial for eliminating engine stress and noise. In addition, eliminating the flow of high-pressure gas into a low-pressure volume further improves the overall efficiency of the engine.

The invention has a number of important features and advantages. While it has been disclosed with specific reference to an engine having a separate combustion chamber, it can also be used advantageously in split cycle engines and other types of advanced engines, as well as in more conventional engines. It provides a faster valve system, and the reduction in forces required to open the valves greatly enhances the efficiency and the performance of the engine. Efficiency is further improved by the elimination of heat loss through the valves, and the system permits variable valve timing to be readily implemented even in conventional engines. With the self-aligning manner in which the moving parts are mounted, variations due to tolerances, wear, thermal expansion, and alignment will not prevent the valves from closing tightly.

It is apparent from the foregoing that a new and improved valve system and method have been provided. While only certain presently preferred embodiments have been described in detail, as will be apparent to those familiar with the art, certain changes and modifications can be made without departing from the scope of the invention as defined by the following claims.

The invention claimed is:

1. A valve assembly for controlling high temperature (1600° K -1800° K) gases in an internal combustion engine, comprising a valve body having an internal chamber with inlet and outlet ports through which the high temperature gasses flow, a valve seat surrounding one of the ports, a pivotally mounted lever arm fabricated of material having low thermal conductivity extending into the chamber, a valve member connected to the lever arm within the chamber for movement between open and closed positions relative to the valve seat, and an actuator connected to the lever arm outside the valve body, away from the high temperature gases, for moving the valve member between the open and closed positions.

2. The valve assembly of claim 1 wherein the valve chamber and ports are surrounded by thermally insulative material that prevents heat loss from the high temperature gasses to the valve body.

3. The valve assembly of claim 1 wherein the lever arm is mounted to the valve body and connected to the valve member in a manner that permits the valve member to pivot about mutually perpendicular axes into proper alignment with the valve seat as the valve member engages the valve seat.

4. The valve assembly of claim 1 wherein there is flexibility between the actuator and the valve member such that the actuator can travel slightly farther than the distance required to move the valve member to its closed position against the valve seat, thereby providing a tight seal between the valve member and seat without exerting unnecessary forces on them.

5. The valve assembly of claim 4 wherein the flexibility is provided by a spring between the actuator and the lever arm.

6. The valve assembly of claim 4 wherein the flexibility is provided by the lever arm.

7. The valve assembly of claim 1 wherein the valve member and the valve seat are fabricated of a ceramic material capable of withstanding temperatures on the order of 1600° K - 1800° K.

8. The valve assembly of claim 7 wherein the valve member and the valve seat are fabricated of aluminum oxide.

9. The valve assembly of claim 1 wherein the valve member and the valve seat have sealing surfaces which engage each other in a plane.

10. The valve assembly of claim 9 wherein the valve member is pivotally connected to the lever arm for movement about an axis parallel to the sealing surfaces.

11. The valve assembly of claim 9 wherein at least one of the sealing surfaces is flat.

12. The valve assembly of claim 9 wherein the valve seat has a flat annular sealing surface, and the valve member has an annular sealing bead that engages the annular sealing surface when the valve member is in the closed position.

13. The valve assembly of claim 1 wherein the lever arm is mounted on a pivot outside the body and away from the high temperature gases.

14. The valve assembly of claim 13 wherein the pivot is a ball joint.

15. The valve assembly of claim 14 wherein the ball joint includes a spherical socket formed partly in an outer portion of the valve body and partly in a retainer attached to the valve body.

16. A valve assembly for controlling communication with a chamber in an internal combustion engine, comprising a valve body having an inlet and outlet ports, a valve seat surrounding one of the ports, a pivotally mounted lever arm extending into the valve body, a valve member connected to the lever arm within the valve body, an actuator connected to the lever arm outside the valve body for moving the valve member between open and closed positions relative to the valve seat, and a pilot valve which can be opened to allow gas to bypass the valve member and thereby reduce the pressure against which the valve member must be moved.

17. The valve assembly of claim 16 wherein the pilot valve includes a bypass port which opens through the valve member and a plug movable between open and closed positions relative to the bypass port.

18. The valve assembly of claim 17 wherein the end portion of the lever arm within the valve body is split lengthwise into a relatively stiff section and a relatively flexible section, with the pilot valve plug being connected to the relatively stiff arm section and the valve member being connected to the relatively flexible arm section.

19. A valve assembly in an internal combustion engine having a compression cylinder, an expansion cylinder, pistons for varying the volumes of the compression and expansion cylinders, and a combustion chamber in which fuel is mixed with compressed gases from the compression cylinder and burned to produce gases at a pressure on the order of 500 to 1000 PSI and a temperature on the order of 1600° K to 1800° K, comprising: a valve body with an inlet port in communication with the combustion chamber and an outlet port in communication with the expansion cylinder, a valve seat surrounding the outlet port, a pivotally mounted lever arm extending into the valve body between the inlet and outlet ports, a valve member connected to the lever arm near the valve seat, and an actuator connected to the lever arm outside the valve body for moving the valve member between open and closed positions relative to the valve seat.

20. The valve assembly of claim 19 including a pilot valve which can be opened to allow gas to bypass the valve member prior to moving the valve member toward the open position and thereby reduce the pressure against which the valve member must open.

21. The valve assembly of claim 19 together with an exhaust valve through which spent gases are expelled during an upstroke of the piston in the expansion cylinder, and means for closing the exhaust valve before the piston finishes the upstroke to develop a pressure in the expansion cylinder substantially equal to the pressure in the combustion chamber before the valve member is moved toward its open position.

22. A method of controlling flow of high temperature (1600° K -1800° K), high pressure (500 - 1000 PSI) gases in an internal combustion engine, comprising the steps of: passing the high temperature, high pressure gases through a chamber having inlet and outlet ports with a valve seat surrounding one of the ports and a valve member connected to a pivotally mounted lever arm within the chamber, and actuating the lever arm from outside the first chamber, away from the high temperature, high pressure gases, to move the valve member between open and closed positions relative to the output port.

23. The method of claim 22 including the step of opening a pilot valve to allow gas to bypass the valve member and thereby reduce the pressure in the chamber prior to moving the valve member toward the open position.

24. The method of claim 22 wherein the inlet port communicates with a combustion chamber in which an air and fuel mixture is combusted to produce the high temperature and high pressure gases, and the outlet port communicates with an expansion cylinder having a piston which is driven in a first direction by expanding gases from the combustion chamber, with an exhaust valve through which spent gases are expelled from the expansion cylinder when the piston is moving in an opposite direction, further including the step of closing the exhaust valve before the piston completes its travel in the opposite direction and allowing pressure to build up in the expansion cylinder to a level corresponding to the pressure in the combustion chamber before the valve member is moved toward the open position.

25. A valve assembly for an internal combustion engine, comprising a body having an internal chamber with inlet and outlet ports through which hot gases flow, a valve seat with a sealing surface surrounding one of the ports, a pivotally mounted lever arm extending into the chamber for movement about a first axis perpendicular to the lever arm, a valve member connected to the lever arm within the chamber for pivotal movement about the axis of the lever arm and about an axis perpendicular to the lever arm and parallel to the sealing surface, and an actuator connected to the lever arm outside the valve body, away from the hot gases, for pivoting the lever arm about the first axis to move the valve member between open and closed positions relative to the valve seat.

* * * * *